United States Patent
Perry et al.

(10) Patent No.: US 10,050,290 B2
(45) Date of Patent: Aug. 14, 2018

(54) REBALANCING ELECTROLYTE CONCENTRATION IN FLOW BATTERY USING PRESSURE DIFFERENTIAL

(71) Applicant: UNITED TECHNOLOGIES CORPORATION, Farmington, CT (US)

(72) Inventors: Michael L. Perry, Glastonbury, CT (US); Andrew Smeltz, Manchester, CT (US); Wei Xie, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/107,517

(22) PCT Filed: Dec. 26, 2013

(86) PCT No.: PCT/US2013/077778
§ 371 (c)(1),
(2) Date: Jun. 23, 2016

(87) PCT Pub. No.: WO2015/099728
PCT Pub. Date: Jul. 2, 2015

(65) Prior Publication Data
US 2016/0315337 A1    Oct. 27, 2016

(51) Int. Cl.
*H01M 8/20* (2006.01)
*H01M 8/04276* (2016.01)
(Continued)

(52) U.S. Cl.
CPC ..... *H01M 8/04186* (2013.01); *H01M 8/0444* (2013.01); *H01M 8/04276* (2013.01);
(Continued)

(58) Field of Classification Search
None
See application file for complete search history.

(56) References Cited

U.S. PATENT DOCUMENTS 4,053,684 A * 10/1977 Zito, Jr. ............ H01M 8/04186
429/450
5,318,865 A    6/1994 Kaneko et al.
(Continued)

FOREIGN PATENT DOCUMENTS

JP    S54-19228    7/1979
JP    H02-148659    6/1990
(Continued)

OTHER PUBLICATIONS

International Search Report and Written Opinion for PCT Application No. PCT/US2013/077778, dated May 5, 2014.
(Continued)

*Primary Examiner* — Jonathan G Leong
*Assistant Examiner* — Christopher P Domone
(74) *Attorney, Agent, or Firm* — Carlson, Gaskey & Olds, P.C.

(57) ABSTRACT

A flow battery that includes an electrochemical cell having first and second half-cells and an ion-selective separator there between wherein a fluid pressure differential across the ion-selective separator for a controlled amount of time is selectively utilized to urge a concentration imbalance of the electrochemically active species between the first and second electrolytes toward a concentration balance.

23 Claims, 1 Drawing Sheet

(51) Int. Cl.
H01M 8/04186 (2016.01)
H01M 8/0444 (2016.01)
H01M 8/04746 (2016.01)
H01M 8/18 (2006.01)

(52) U.S. Cl.
CPC ....... H01M 8/04783 (2013.01); H01M 8/188 (2013.01); H01M 8/20 (2013.01); *Y02E 60/528* (2013.01)

(56) References Cited

U.S. PATENT DOCUMENTS

| | | | |
|---|---|---|---|
| 5,648,184 A | 7/1997 | Inoue et al. | |
| 6,841,294 B1* | 1/2005 | Morrissey | H01M 8/04186 429/101 |
| 9,166,243 B2 | 10/2015 | Perry | |
| 2006/0108214 A1 | 5/2006 | Amendola | |
| 2008/0193828 A1* | 8/2008 | Sahu | B60L 11/1822 429/63 |
| 2008/0274393 A1 | 11/2008 | Markoski et al. | |
| 2008/0292938 A1 | 11/2008 | Perry et al. | |
| 2009/0136789 A1 | 5/2009 | Pien et al. | |
| 2012/0149573 A1 | 6/2012 | Krupadanam et al. | |
| 2012/0202099 A1 | 8/2012 | Perry et al. | |
| 2012/0321920 A1 | 12/2012 | Perry et al. | |
| 2013/0059189 A1* | 3/2013 | Benham | H01M 8/20 429/101 |
| 2013/0136199 A1 | 11/2013 | Keshavarz et al. | |
| 2014/0127542 A1* | 5/2014 | Li | H01M 8/0243 429/74 |

FOREIGN PATENT DOCUMENTS

| | | |
|---|---|---|
| JP | H02195657 | 8/1990 |
| JP | 2006-156029 | 6/2006 |
| JP | 2012164530 | 8/2012 |
| WO | 2013018383 A1 | 4/2013 |

OTHER PUBLICATIONS

International Preliminary Report on Patentability for PCT Application No. PCT/US2013/077778, dated Apr. 29, 2016.
File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Cretì, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2001 pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated low fields. AlChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frias-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.
European Search Report for European Patent Application No. 13900139 completed Jul. 7, 2017.

\* cited by examiner

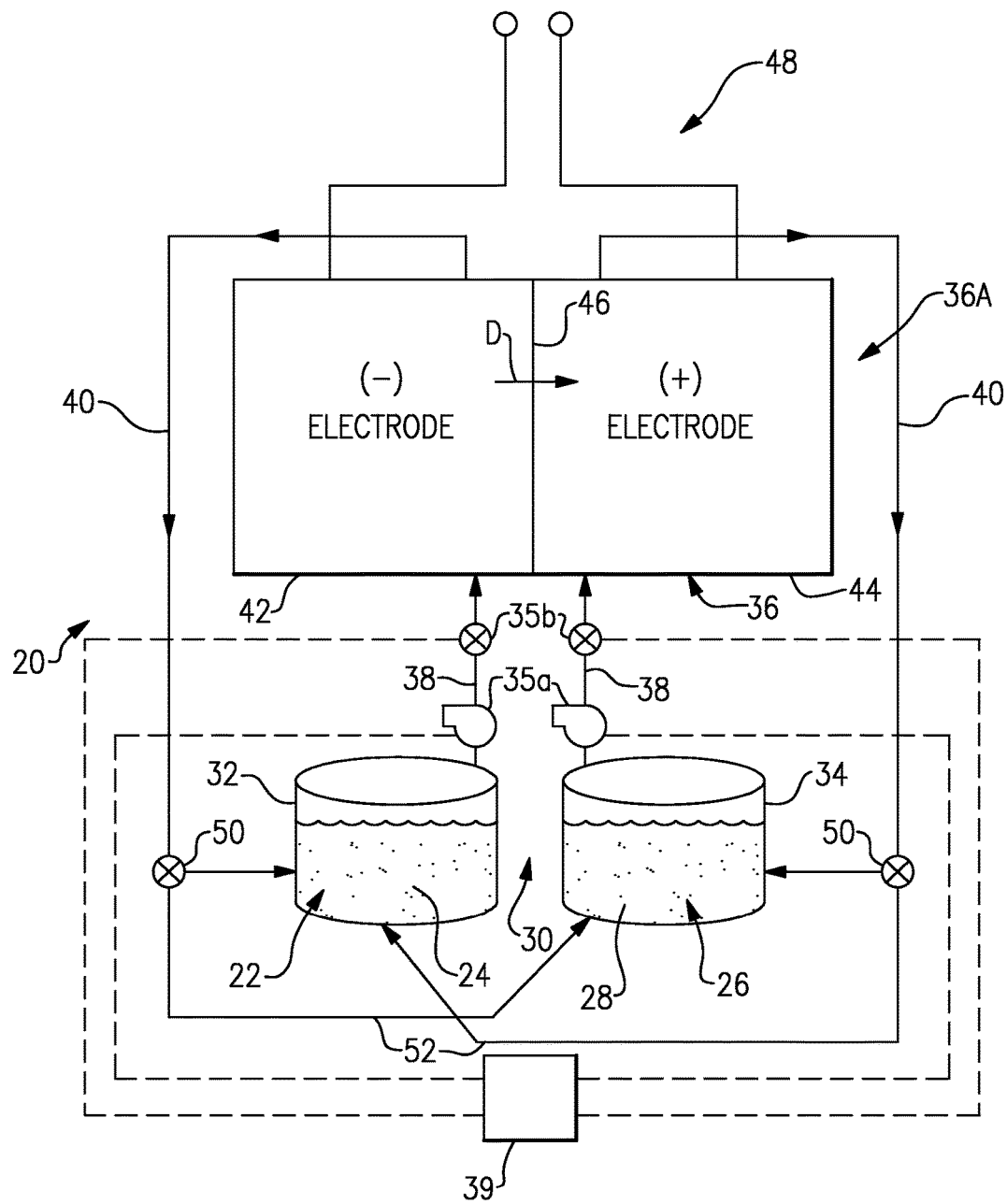

REBALANCING ELECTROLYTE CONCENTRATION IN FLOW BATTERY USING PRESSURE DIFFERENTIAL

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive reversible electrochemical redox reactions.

Upon charging, the electrical energy supplied into the flow battery causes an electrochemical reduction reaction in one electrolyte on one electrode and an electrochemical oxidation reaction in the other electrolyte on another electrode. The separator prevents the electrolytes from freely and rapidly mixing but permits ions to pass through to complete the redox reactions. Ideally, the separator has selective ion transport properties, i.e., it allows the desired charge-carrier ions to pass through easily relative to other ions, such as the active redox couple ions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include ions of elements that have multiple, reversible oxidation states and all of which are dissolved or dissolvable in a selected liquid solution.

SUMMARY

A disclosed method of rebalancing electrolyte concentration in a flow battery according to an example of this disclosure includes providing a flow battery that has an electrochemical cell having first and second half-cells and an ion-selective separator there between, a first electrolyte circulable through the first half-cell and a second electrolyte circulable through the second half-cell, the first and second electrolytes including one or more types of electrochemically active species dissolved therein, and selectively establishing a fluid pressure differential across the ion-selective separator for a controlled amount of time to urge a concentration imbalance of the electrochemically active species between the first and second electrolytes toward a concentration balance.

Also disclosed is a flow battery that includes a controller connected to control operation of at least a supply/storage system. The controller is configured to control the supply/storage system to selectively establish a fluid pressure differential across the ion-selective separator for a controlled amount of time to urge a concentration imbalance of the electrochemically active species between the first and second electrolytes toward a concentration balance.

A disclosed method of rebalancing electrolyte state-of-charge in a flow battery according to an example of this disclosure includes operating a flow battery to establish a controlled fluid pressure differential across an ion-selective separator such that there is a higher fluid pressure in a negative half-cell than in a positive half-cell of the flow battery to, by pressure-driven osmosis, dilute a catholyte solution in the positive half-cell and concentrate an anolyte solution in the negative half-cell with respect to an electrochemically active specie dissolved in the solutions.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example flow battery.

DETAILED DESCRIPTION

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes a fluid electrolyte 22 (e.g., a first ionic-conductive fluid) that has an electrochemically active specie 24 that undergoes reversible redox reactions. The fluid electrolyte 22 functions in a redox pair with regard to an additional fluid electrolyte 26 (e.g., a second ionic-conductive fluid) that has an electrochemically active specie 28. A fixed amount of the fluid electrolytes 22/26 are used in the flow battery.

The electrochemically active species 24/28 include ions of elements that have multiple, reversible oxidation states in a selected liquid solution, such as but not limited to, aqueous sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. The electrochemically active species 24/28 can also be organic species, such as but not limited to, quinones and the corresponding hydroquinones. In some examples, the multiple oxidation states can include the zero oxidation state if the element is readily soluble in the selected liquid solution in the zero oxidation state. Such elements can include the halogens, such as bromine, chlorine, and combinations thereof.

The first fluid electrolyte 22 (e.g., the negative electrolyte or anolyte) and the second fluid electrolyte 26 (e.g., the positive electrolyte or catholyte) are contained in a supply/storage system 30 that includes first and second vessels 32/34 and pumps 35a. The pumps 35a can be variable speed pumps. The fluid electrolytes 22/26 are delivered from the first and second vessels 32/34, using the pumps 35a, to a cell stack 36A of electrochemically active cells 36 (one representative cell shown) of the flow battery 20 through respective feed lines 38. The fluid electrolytes 22/26 are returned from the cell stack 36A to the vessels 32/34 via return lines 40. The feed lines 38 and the return lines 40 (collectively "fluid lines") interconnect the vessels 32/34 with the electrochemically active cells 36 of the cell stack 36A to form respective recirculation loops for the fluid electrolytes 22/26. In this example, the feed lines 38 include control valves 35b that are operable to meter flow of fluid electrolytes 22/26. The pumps 35a and control valves 35b can alternatively be situated in other locations in the feed lines 38, return lines 40, and vessels 32/34. In another alternative, the flow battery 20 can include additional pumps 35a and/or control valves 35b.

In this example, the flow battery 20 also includes a controller 39. The controller 39 is connected to control operation of at least the supply/storage system 30, including the operation of the ON/OFF and speed of the pumps 35a and the metering regulation function of the control valves 35b. The pumps 35a and the control valves 35b can thus be utilized to control flow of the fluid electrolytes 22/26 in the flow battery 20 and also, as will be described further below, a fluid pressure differential between the fluid electrolytes 22/26.

The electrochemically active cells 36 each include a first electrode 42 (e.g., first half-cell or negative half-cell), a second electrode 44 (e.g., second half-cell or positive half-cell) spaced apart from the first electrode 42, and an ion-selective separator layer 46 arranged between the first electrode 42 and the second electrode 44. For example, the electrodes 42/44 are porous carbon structures, such as carbon paper or felt. The electrochemically active cells 36 can also include manifold plates, manifolds and the like for delivering the fluid electrolytes 22/26 to the electrodes 42/44. It is to be understood, however, that other configurations can be used. For example, the electrochemically active cells 36 can alternatively be configured for flow-through operation where the fluid electrolytes 22/26 are pumped directly into and through the electrodes 42/44 without the use of adjacent flow field channels.

The ion-selective separator layer 46 can be an ion-exchange membrane, an inert micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states.

The fluid electrolytes 22/26 are delivered to the electrochemically active cells 36 to either convert electrical energy into chemical energy or, in the reverse reaction, convert chemical energy into electrical energy that can be discharged. The electrical energy is transmitted to and from the electrochemically active cells 36 through an electric circuit 48 that is electrically coupled with the electrodes 42/44.

The energy capacity for a given flow battery and fixed amount of anolyte/catholyte can change over time due to several factors. One factor is diffusional movement of the electrochemically active species across the ion-selective separator, called crossover, which causes a concentration imbalance (molar concentration) between the two fluid electrolytes 22/26. Another factor is side reactions, such as hydrogen evolution reactions, that occur within the flow battery which can contribute to a shift in an average oxidation state of the electrochemically active species over time. The flow battery can be "rebalanced" to reverse the effects of crossover in order to maintain maximal energy capacity. One method utilizes a connecting pipe and valve between the electrolyte reservoirs to periodically allow liquid levels between the first and second tanks to equalize and to allow concentration-driven diffusion to occur between electrolyte tanks. However, in this method, the rate of diffusion cannot be actively controlled. Another method consists of fully or partially mixing the fluid electrolytes together and then redistributing the electrolyte into the first and second vessels 32/34 of the flow battery. However, a full or partial mixing redistribution requires additional equipment and down time that disrupts normal battery operation. As will be described, the flow battery 20 herein provides a controlled method of "online" rebalancing of electrolyte that can reduce or eliminate the need for full or partial remixing and limit operation disruption.

In one example based on vanadium, the fully balanced average oxidation state is +3.5 based upon the use of $V^{2+}/V^{3+}$ and $V^{4+}/V^{5+}$ (which can also be denoted as V(ii)/V(iii) and V(iv)/V(v), although the valences of the vanadium species with oxidation states of 4 and 5 are not necessarily 4+ and 5+) as the electrochemically active species 24/28. For example, if the electrolyte solution is aqueous sulfuric acid, then the V(iv)/V(v) species will be present as $VO^{2+}$ and $VO_2^+$, respectively.

The concentration of the electrochemically active species 24/28 in each reservoir can be determined either directly or indirectly. In one example based on vanadium as the common electrochemically active species 24/28, the valence states include $V^{2+}/V^{3+}$ and $V^{4+}/V^{5+}$. In one further example, the molar concentrations of the different valence states of the electrochemically active species 24/28 can be obtained using an optical detector device that collects molar concentration measurements of the electrochemically active species 24/28 in one or both of the vessels 32/34 using optical measurements. For example, the optical detector device utilizes light to detect molar concentration.

The concentration of active species in each reservoir can alternatively be determined by directly measuring the concentrations of the different valence states using a titration technique, although the titration technique is not a real-time measurement and can, therefore, potentially introduce a time lag.

Alternatively or in addition to determining the active specie concentration directly, the concentration in each reservoir can be determined indirectly from other properties of the fluid electrolytes 22/26. For example, measurements can be collected for conductivity, density, viscosity, or combinations thereof, of the fluid electrolytes 22/26. The conductivity, density and/or viscosity can be correlated experimentally to the average oxidation state of the electrochemically active species 24/28. Thus, these indirect measurements can also be used to determine the concentration of active species in each reservoir, or alternatively to verify direct measurements.

An example of the disclosed method, which can be used in conjunction with the disclosed flow battery 20, includes selectively establishing a fluid pressure differential, represented at D in FIG. 1, across the ion-selective separator 46 for a controlled amount of time to urge a concentration imbalance of the electrochemically active species 24/28 between the fluid electrolytes 22/26 toward a concentration balance. For example, the controlled amount of time is a time to achieve, or estimated to achieve, a predefined concentration balance.

The controller 39 can be configured to implement the method through control of the supply/distribution system 30. In this regard, the controller 39 can include hardware, software, or both, that is programmed to perform the functions described herein. The controller 39 can utilize any of at least several different approaches to implement the method in the flow battery 20. For example, the controller 39 can utilize the method periodically, in response to a detected concentration difference between the fluid electrolytes 22/26 exceeding a predefined threshold, to rebalance the concentrations. Alternatively, the controller 39 can establish a continuous fluid pressure differential, to maintain balanced concentrations within a predefined concentration range.

The controller 39 can control the fluid pressure differential via control of the pumps 35a and control valves 35b. For example, the controller 39 can establish unequal flow rates between the fluid electrolytes 22/26 to establish the fluid pressure differential. In this regard, increasing the flow rate of one of the fluid electrolytes 22/26 relative to the other increases the pressure differential. Similarly, decreasing the flow rate of one of the fluid electrolytes 22/26 relative to the other can also increase the pressure differential.

In a further example, the electrochemically active species 24/28 can tend to concentrate in the catholyte 26 over time due to crossover. To rebalance the concentration, the controller 39 establishes the flow rate of the anolyte 22 to be greater than the flow rate of the catholyte 26. The greater flow rate in the anolyte 22 causes higher fluid pressure in the negative half-cell 42 to, by pressure-driven osmosis, dilute the concentration of specie 28 in the catholyte 26 in the positive half-cell 44 and concentrate the specie 24 in the anolyte 22 in the negative half-cell 42. That is, osmosis alone is a spontaneous concentration-driven movement of electrolyte. The "pressure-driven osmosis" is the active application of a fluid pressure on the less concentrated electrolyte to supplement any spontaneous osmosis.

In another example, the controller 39 establishes the fluid pressure differential with respect to electrolyte flux through the ion-selective separator 46. For example, for a given ion-selective separator 46, a model of electrolyte flux can be determined. The model can be determined experimentally for flux as a function of pressure differential. Alternatively, flux as a function of pressure differential can be estimated based on known properties of the ion-selective separator 46 and of the electrolytes. Thus, for a given known concentration imbalance in the flow battery 20, there is a determinable amount of electrolyte that must be pressure-driven across the ion-selective separator 46 to achieve a desired concentration balance. The controller 39 thus provides a selected fluid pressure differential for a controlled amount of time according to the model to achieve the desired concentration balance.

The method can be used to reduce the need for a full or partial mixing rebalancing, as discussed above. However, in a further example of any of the examples herein, the method can be used in combination with a partial remixing or tank-to-tank transfers of the electrolytes 22/26. For example, small aliquots of electrolyte can be transferred between the vessels 32/34 to achieve the desired molar ratio in each reservoir. The transfer can be conducted using an auxiliary pump between the vessels 32/34 or using the main pumps in conjunction with a diverter valve 50 and auxiliary piping 52 to divert electrolyte from the stack to the other tank. The transfer can also be performed using a connecting pipe and valve between the vessels 32/34 that selectively opens to even the fluid electrolyte levels in the vessels 32/34 when desired (e.g., during shutdown at low state-of-charge).

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGURES or all of the portions schematically shown in the FIGURES. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of rebalancing electrolyte concentrations in a flow battery, the method comprising:
    (a) providing a flow battery that includes an electrochemical cell having first and second half-cells and an ion-exchange membrane separator there between, a first electrolyte circulable through the first half-cell and a second electrolyte circulable through the second half-cell, the first and second electrolytes including one or more types of electrochemically active species dissolved therein; and
    (b) selectively establishing a fluid pressure differential across the ion-exchange membrane separator for a controlled amount of time to urge a concentration imbalance of the electrochemically active species between the first and second electrolytes toward a concentration balance, wherein establishing the fluid pressure differential is in response to the concentration imbalance.

2. The method as recited in claim 1, wherein said step (b) includes establishing the fluid pressure differential according to a model of electrolyte flux through the ion-exchange membrane separator.

3. The method as recited in claim 1, wherein said step (b) includes establishing the fluid pressure differential by using unequal flow rates between the first and second electrolytes in the flow battery.

4. The method as recited in claim 3, wherein the flow rate of a less concentrated one of the first and second electrolytes is greater than the flow rate of a more concentrated one of first and second electrolytes, with respect to the concentrations of the one or more types of electrochemically active species.

5. The method as recited in claim 1, wherein said step (b) includes establishing the fluid pressure differential with respect to electrolyte flux through the ion-exchange membrane separator.

6. The method as recited in claim 1, wherein the active specie in first electrolyte is V(ii)/V(iii) and the active specie in second electrolyte is V(iv)/V(v).

7. A flow battery comprising:
    an electrochemical cell having first and second half-cells and an ion-exchange membrane separator there between;
    a first electrolyte circulable through the first half-cell;
    a second electrolyte circulable through the second half-cell, the first and second electrolytes including one or more types of electrochemically active species dissolved therein;
    a supply/storage system external of the electrochemical cell, the supply/storage system including first and second vessels, fluid lines connecting the first and second vessels to, respectively, the first and second half-cells, a plurality of pumps operable to circulate the first and second electrolytes, and a plurality of control valves operable to control flow of the first and second electrolytes; and a controller connected to control operation of at least the supply/storage system, the controller configured to control the supply/storage system to selectively establish a fluid pressure differential across the ion-exchange membrane separator for a controlled amount of time to urge a concentration imbalance of the electrochemically active species between the first and second electrolytes toward a concentration balance.

8. The flow battery as recited in claim 7, wherein the controller is configured to establish the fluid pressure differential in response to the concentration imbalance.

9. The flow battery as recited in claim 7, wherein the controller is configured to establish the fluid pressure differential according to a model of electrolyte flux through the ion-exchange membrane separator.

10. The flow battery as recited in claim 7, wherein the controller is configured to establish the fluid pressure differential establishing unequal flow rates between the first and second electrolytes.

11. The flow battery as recited in claim 10, wherein the controller is configured to establish the flow rate of a less concentrated one of the first and second electrolytes to be greater than the flow rate of a more concentrated one of first and second electrolytes, with respect to the concentrations of the one or more types of electrochemically active species.

12. The flow battery as recited in claim 7, wherein the controller is configured to establish the fluid pressure differential with respect to electrolyte flux through the ion-exchange membrane separator.

13. The flow battery as recited in claim 7, wherein the active specie in first electrolyte is V(ii)/V(iii) and the active specie in second electrolyte is V(iv)/V(v).

14. A method of rebalancing electrolyte state-of-charge in a flow battery, the method comprising:

operating a flow battery to establish a controlled fluid pressure differential across an ion-exchange membrane separator such that there is a higher fluid pressure in a first half-cell than in a second half-cell of the flow battery to, by pressure-driven osmosis, dilute the more concentrated solution in the second half-cell and concentrate the more dilute solution in the first half-cell with respect to an electrochemically active specie dissolved in the solutions.

15. The method as recited in claim 14, wherein operating the flow battery includes establishing the controlled fluid pressure differential in response to a concentration imbalance between the first solution, which is an anolyte solution, and the second solution, which is a catholyte solution.

16. The method as recited in claim 14, wherein operating the flow battery includes establishing the controlled fluid pressure differential with respect to electrolyte flux through the ion-exchange membrane separator.

17. The method as recited in claim 14, wherein the active specie in first solution is V(ii)/V(iii) and the active specie in second solution is V(iv)/V(v).

18. The method as recited in claim 1, wherein said step (b) includes establishing the fluid pressure differential by using unequal flow rates between the first and second electrolytes in the flow battery such that the fluid pressure of a less concentrated one of the first and second electrolytes is greater than the fluid pressure of a more concentrated one of first and second electrolytes, with respect to the concentrations of the one or more types of electrochemically active species.

19. The method as recited in claim 18, wherein the less concentrated one of the first and second electrolytes is an anolyte and the more concentrated one of first and second electrolytes is a catholyte.

20. The flow battery as recited in claim 7, wherein the controller is configured to establish the fluid pressure differential by using unequal flow rates between the first and second electrolytes in the flow battery such that the fluid pressure of a less concentrated one of the first and second electrolytes is greater than the fluid pressure of a more concentrated one of first and second electrolytes, with respect to the concentrations of the one or more types of electrochemically active species.

21. The flow battery as recited in claim 20, wherein the less concentrated one of the first and second electrolytes is an anolyte and the more concentrated one of first and second electrolytes is a catholyte.

22. The method as recited in claim 14, wherein the establishing of the fluid pressure differential includes using unequal flow rates between first and second electrolytes in the flow battery such that the fluid pressure of a less concentrated one of the first and second electrolytes is greater than the fluid pressure of a more concentrated one of first and second electrolytes, with respect to the concentrations of the one or more types of electrochemically active species.

23. The method as recited in claim 22, wherein the less concentrated one of the first and second electrolytes is an anolyte and the more concentrated one of first and second electrolytes is a catholyte.

* * * * *

UNITED STATES PATENT AND TRADEMARK OFFICE
CERTIFICATE OF CORRECTION

PATENT NO. : 10,050,290 B2
APPLICATION NO. : 15/107517
DATED : August 14, 2018
INVENTOR(S) : Michael L. Perry, Andrew Smeltz and Wei Xie Page 1 of 1

It is certified that error appears in the above-identified patent and that said Letters Patent is hereby corrected as shown below:

In the Claims

In Claim 6, Column 6, Line 51; replace "in first electrolyte" with --in the first electrolyte--

In Claim 6, Column 6, Line 52; replace "in second electrolyte" with --in the second electrolyte--

In Claim 13, Column 7, Line 34; replace "in first electrolyte" with --in the first electrolyte--

In Claim 13, Column 7, Line 35; replace "in second electrolyte" with --in the second electrolyte--

In Claim 17, Column 8, Line 8; replace "in first solution" with --in the first solution--

In Claim 17, Column 8, Line 8-9; replace "in second solution" with --in the second solution--

In Claim 18, Column 8, Line 13; replace "such that the fluid" with --such that a fluid--

In Claim 18, Column 8, Line 15; replace "such that the fluid" with --such that a fluid--

In Claim 18, Column 8, Line 15-16; replace "of first and second" with --of the first and second--

In Claim 20, Column 8, Line 26; replace "that the fluid" with --that a fluid--

In Claim 20, Column 8, Line 28; replace "than the fluid" with --than a fluid--

In Claim 21, Column 8, Line 34; replace "of first and second" with --of the first and second--

In Claim 22, Column 8, Line 38; replace "between first and second" with --between the first and second--

In Claim 23, Column 8, Line 47; replace "one of first and second" with --one of the first and second--

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*